United States Patent
Happ et al.

(10) Patent No.: US 12,387,620 B1
(45) Date of Patent: Aug. 12, 2025

(54) VARIABLE FORCE KEYBOARD

(71) Applicant: Geneva Lake Astrophysics and STEAM, Inc., Walworth, WI (US)

(72) Inventors: Lawrence R. Happ, Lake Geneva, WI (US); Kate Meredith, Williams Bay, WI (US); Katya Gozman, Ann Arbor, MI (US)

(73) Assignee: Geneva Lake Astrophysics and STEAM, Inc., Walworth, WI (US)

( * ) Notice: Subject to any disclaimer, the term of this patent is extended or adjusted under 35 U.S.C. 154(b) by 911 days.

(21) Appl. No.: 17/550,853

(22) Filed: Dec. 14, 2021

Related U.S. Application Data

(60) Provisional application No. 63/125,222, filed on Dec. 14, 2020.

(51) Int. Cl.
G09B 21/00 (2006.01)

(52) U.S. Cl.
CPC .................. G09B 21/004 (2013.01)

(58) Field of Classification Search
CPC ........... G09B 21/004; G10H 2220/311; G10H 1/346; G10H 3/12
See application file for complete search history.

(56) References Cited

U.S. PATENT DOCUMENTS

| | | | |
|---|---|---|---|
| 4,191,945 A | 3/1980 | Hannen et al. | |
| 4,735,516 A | 4/1988 | Galarneau | |
| 5,209,584 A | 5/1993 | Galarneau | |
| 6,059,575 A | 5/2000 | Murphy | |
| 6,639,510 B1 | 10/2003 | Soulie | |
| 7,706,509 B2 | 4/2010 | Salpietra | |
| 8,047,849 B2 | 11/2011 | Ahn et al. | |
| 8,740,618 B2 | 6/2014 | Shaw | |
| 2009/0188374 A1* | 7/2009 | Folkesson | G10H 1/34 84/423 R |
| 2020/0303140 A1 | 9/2020 | Porcella et al. | |

FOREIGN PATENT DOCUMENTS

| | | | |
|---|---|---|---|
| JP | 61273819 A | * | 12/1986 |
| JP | 2005128610 A | * | 5/2005 |
| JP | 2013160932 A | * | 8/2013 |

OTHER PUBLICATIONS

Komatsu Akihiko, Electronic Keyboard Apparatus, Aug. 19, 2013, English translation (Year: 2013).*
Shirabe Akira, Keyboard Device, May 19, 2005, English translation (Year: 2005).*
Nakagawa Hiromitsu, Keyboard, Dec. 4, 1986, English translation (Year: 1986).*

* cited by examiner

*Primary Examiner* — Dmitry Suhol
*Assistant Examiner* — Jose Angeles
(74) *Attorney, Agent, or Firm* — von Briesen & Roper, s.c.

(57) ABSTRACT

A variable force keyboard may include a keyboard box, a plurality of keys operatively connected to the keyboard box for movement relative to the keyboard box, and, for each of the plurality of keys, a resistive force may be provided that opposes movement of the corresponding one of the plurality of keys. The resistive force may be applied by key springs or other like structures acting on the keys, or the keys may be resilient structures such as cantilever springs that resist displacement. The variable force keyboard is configured to model a graphical, mathematical or physical relationship by varying the resistive force on each of the plurality of keys to correspond to values of the graphical, mathematical or physical relationship modeled by the variable force keyboard.

20 Claims, 7 Drawing Sheets

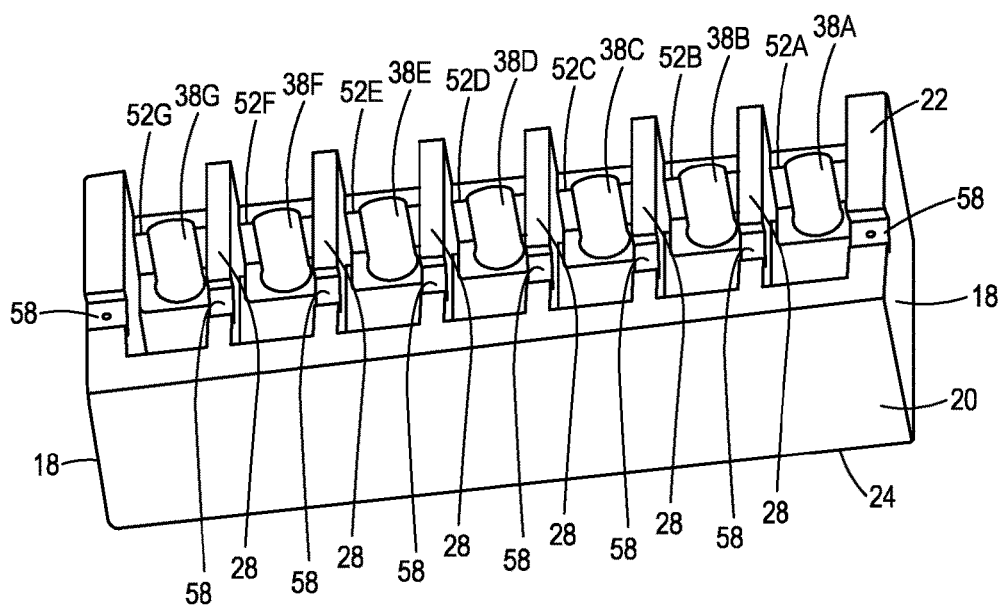
FIG. 5
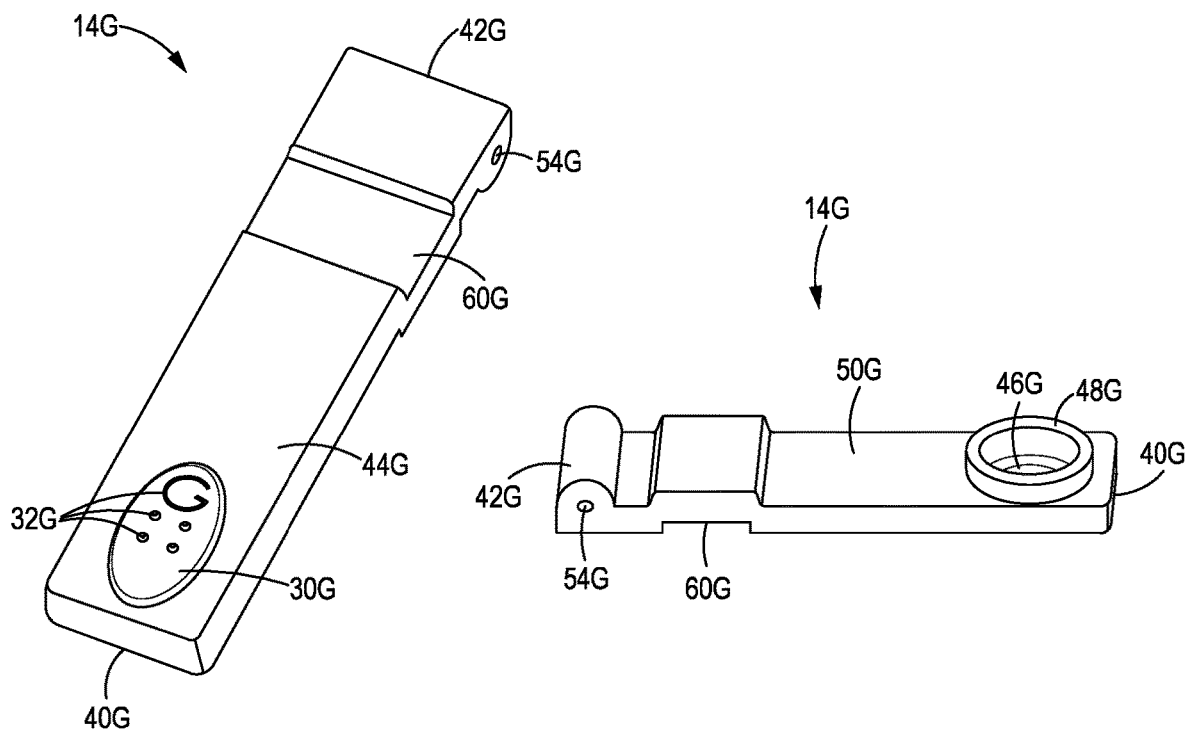
FIG. 6
FIG. 7

VARIABLE FORCE KEYBOARD

CROSS-REFERENCE TO RELATED APPLICATION

This application claims the benefit of U.S. Provisional Patent Application No. 63/125,222, filed Dec. 14, 2020, which is incorporated by reference herein in its entirety.

TECHNICAL FIELD

The present disclosure relates generally to educational aids and, more particularly, to a variable force keyboard configured with keys having varying resistive forces when pressed in sequence to provide a tactile representation of a graphable, mathematical and/or physical relationship.

BACKGROUND

Infants begin learning about their physical world from the moment they are born through a variety of sensory inputs. As they grow, babies begin to investigate things that they can see, hear, touch or smell. As children develop, the physical immediacy of learning through direct sensory input remains important but becomes secondary to visual instructions and/or reading about the world in books. Still, research has shown that greater understanding is gained when learning experiences can be coupled with direct sensory input. Furthermore, the more varied the input, the greater the understanding and retention.

This process of direct sensory input using a variety of modalities (i.e. seeing, hearing, and/or kinesthetically interpreting information) becomes critical when we try to understand more complex and abstract concepts. As a student's education becomes more sophisticated and technical, educators must rely on a variety of methods to ensure understanding, retention and competence. This is particularly important in the understanding of mathematical concepts, specifically in understanding the relationships between objects and the physics which define their relationships. The more ways in which we can sensorially understand the relationships between and among objects or concepts, the better our understanding and long-term retention of this information will be.

Every child evolves their own special way of learning. Some learners are more visual. Some are more auditory. Others understand best using kinesthetic inputs. However, skilled educators understand that the more varied ways that a concept is presented, the greater the chance of long-term retention. This process becomes challenging when learners have physical and/or sensory limitations. When one sensory channel (i.e. sight, hearing) is not available for learning, other methods of input must be utilized. For example, individuals who are deaf/hard of hearing use sign language in order to learn and discuss concepts or students who are blind/visually impaired use braille and/or kinesthetic inputs to enhance learning. By utilizing a variety of sensory inputs, educators who work with students who have disabilities can greatly enhance learning. Furthermore, research has shown that all students-including regular education students—can have enhanced understanding and learning when a variety of modalities are engaged during instruction. When closed captioning is used for educational videos in the classroom, for example, this accommodation for students who are deaf or hard of hearing also enhances the understanding for general education students. When 3D graphics are used to enhance understanding in students with blind or visual impairments, regular education students benefit as well. This concept is known as universal design-when instruction is designed for students who have special needs, but general education students benefit from the design as well.

SUMMARY OF THE DISCLOSURE

In one aspect of the present disclosure, a variable force keyboard is disclosed. The variable force keyboard may include a keyboard box, a plurality of keys operatively connected to the keyboard box for movement relative to the keyboard box, and, for each of the plurality of keys, a key spring operatively connected between the keyboard box and the corresponding one of the plurality of keys to provide a resistive force that opposes movement of the corresponding one of the plurality of keys. The variable force keyboard is configured to model a graphical, mathematical or physical relationship by varying the resistive force of the key spring of each of the plurality of keys to correspond to values of the graphical, mathematical or physical relationship modeled by the variable force keyboard.

In another aspect of the present disclosure, a method for providing a tactile representation of a graphical, mathematical or physical relationship on a variable force keyboard is disclosed. The method may include providing a keyboard box, mounting a plurality of keys to the keyboard box, wherein each of the plurality of keys is movable relative to the keyboard box, and providing a resistive force on each of the plurality of keys against movement relative to the keyboard box. The resistive force on each of the plurality of keys may be varied to correspond to values of the graphical, mathematical or physical relationship to provide the tactile representation of the graphical, mathematical or physical relationship on the variable force keyboard.

In a further aspect of the present disclosure, a variable force keyboard is disclosed. The variable force keyboard may include a keyboard box, and a plurality of keys operatively connected to the keyboard box for movement relative to the keyboard box. Each of the plurality of keys may have a resistive force applied thereto that opposes movement of the corresponding one of the plurality of keys relative to the keyboard box. The variable force keyboard may be configured to model a graphical, mathematical or physical relationship by varying the resistive force applied to each of the plurality of keys to correspond to values of the graphical, mathematical or physical relationship modeled so that depressing the plurality of keys provides a tactile representation of the graphical, mathematical or physical relationship.

Additional aspects are defined by the claims of this patent.

BRIEF DESCRIPTION OF THE DRAWINGS

FIG. 5 is a top rear view of a keyboard box of the variable force keyboard of FIG. 1;

FIG. 6 is a top left view of an exemplary key of the variable force keyboard of FIG. 1;

FIG. 7 is a bottom left view of the key of FIG. 6;

DETAILED DESCRIPTION

A variable force keyboard in accordance with the present disclosure presents an alternative method of leaning through a unique method using an individual's sense of touch to make comparative evaluations in data. The variable force keyboard utilizes the concept of universal design by envisioning an accommodation for students who are blind or visually impaired, while at the same time understanding that this tool can enhance learning for all students. In general terms, the variable force keyboard has a plurality of keys configured with varying resistance forces when the keys are depressed by a user such as a blind or visually impaired student to represent a graphable or mathematical concept. In one specific application, the variable force keyboard is setup as a means for understanding a mathematical relationship in the field of astronomy. In a broader sense, the variable force keyboard presents an alternate method for conveying or teaching a wide range of functional relationships in the physical world through tactile feedback. While the variable force keyboard has particular application to the education of the visually impaired, it can be instructional for all individuals within the universal design concept because it presents an alternative method of understanding graphable and/or mathematical relationships. For the visually impaired individual and others, the variable force keyboard may provide special insight and understanding on the subject.

Figure 1:
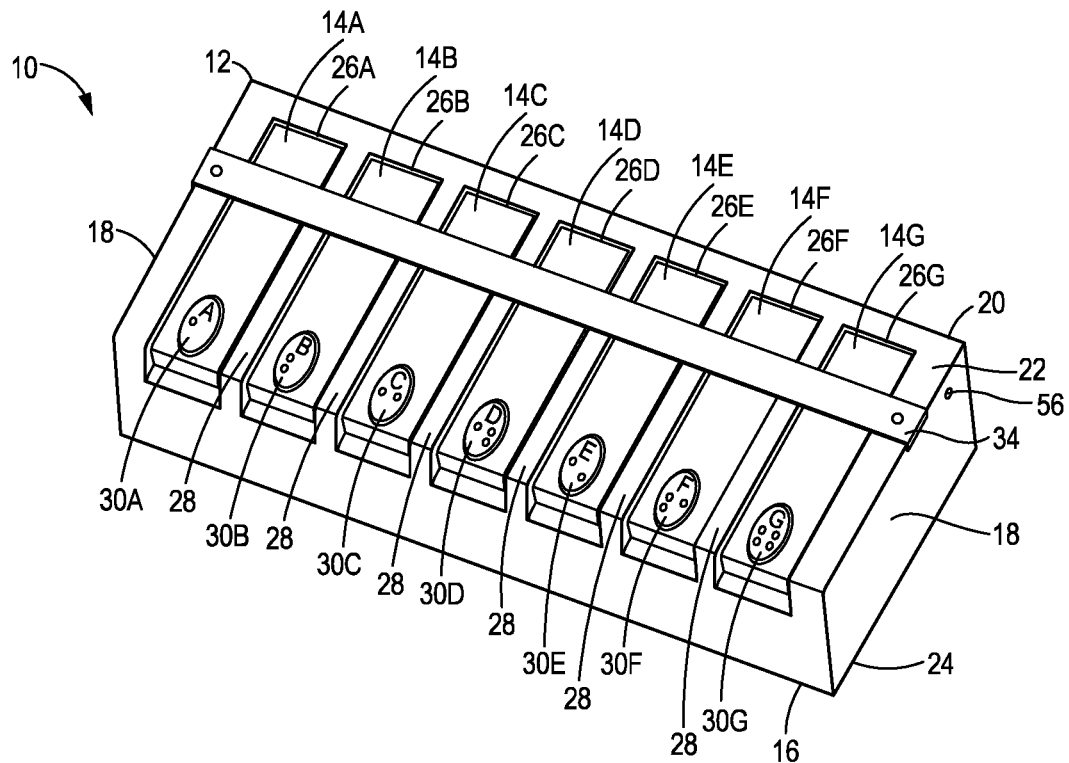
FIG. 1 is a front left isometric view of a variable force keyboard in accordance with the present disclosure.

FIG. 1 illustrates an exemplary embodiment of a variable force keyboard 10 in accordance with the present disclosure. The variable force keyboard 10 as illustrated can be configured to provide a tactile representation of up to seven data points from a graphable and/or mathematical relationship. In this embodiment, the variable force keyboard 10 may be arranged similar to a piano keyboard with seven keys that includes a keyboard box 12 and accompanying keys 14A-14G that are mounted to the keyboard box 12 for movement relative to the keyboard box 12. The keyboard box 12 may include a front wall 16, oppositely disposed sidewalls 18, a rear wall 20, a top wall 22 and a bottom wall 24. The front wall 16 and the top wall 22 may include cut out portions there in creating key openings 26A-26G in which the keys 14A-14G are disposed. The keys 14A-14G may be separated by dividing walls 28 between the key openings 26A-26G. The particular configurations of the keyboard box 12 and of other keyboard boxes as illustrated and described herein are exemplary and not are not indicative of geometric constraints on variable force keyboards 10. Keyboard boxes as used herein may be any appropriate containers, housings or support structures for the keys 14A-14G or other operational components capable of being implemented in variable force keyboards 10 in accordance with the present disclosure to provide tactile representations of graphable, mathematical and/or physical relationships.

Figure 2:
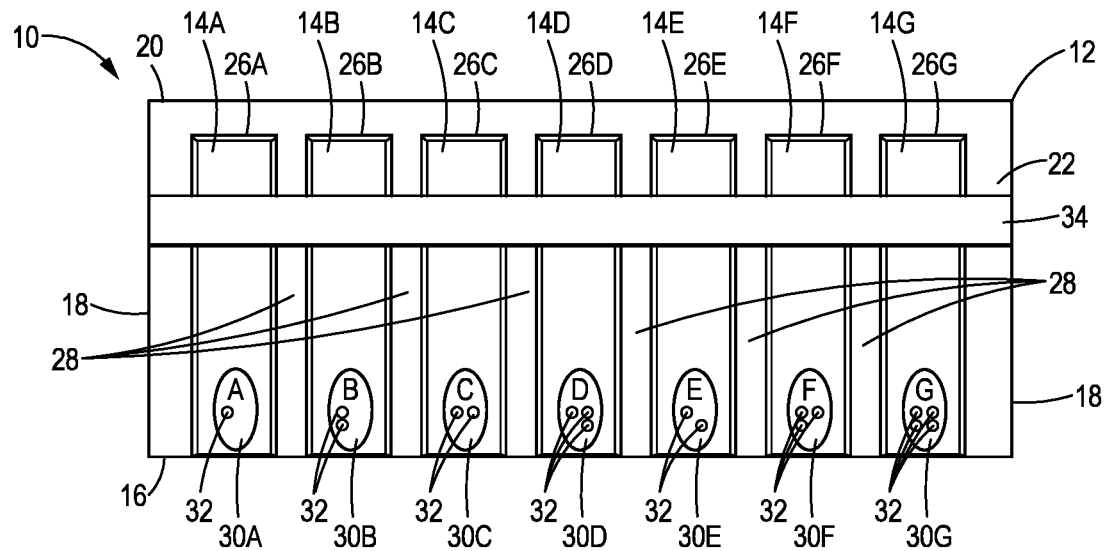
FIG. 2 is a top view of the variable force keyboard of FIG. 1.

As shown in the isometric view of FIG. 1 and in the top view of FIG. 2, the keys 14A-14G may include finger rests 30A-30G extending upward on top surfaces thereof proximate the front wall 16. The finger rests 30A-30G may indicate to a user of the variable force keyboard 10 the appropriate locations to place their fingers for interaction with the variable force keyboard 10. The finger rests 30A-30G may each include raised key indicia 32 such as braille dot combinations, numerals, letters, geometric shapes or other identifying features that may differentiate the keys 14A-14G from each other. As further illustrated in FIGS. 1 and 2, the keys 14A-14G may be held in place within the key openings 26A-26G in the manner described more fully below by a lock bar 34 that may extend across the top wall 22 proximate the rear wall 20.

Figure 3:
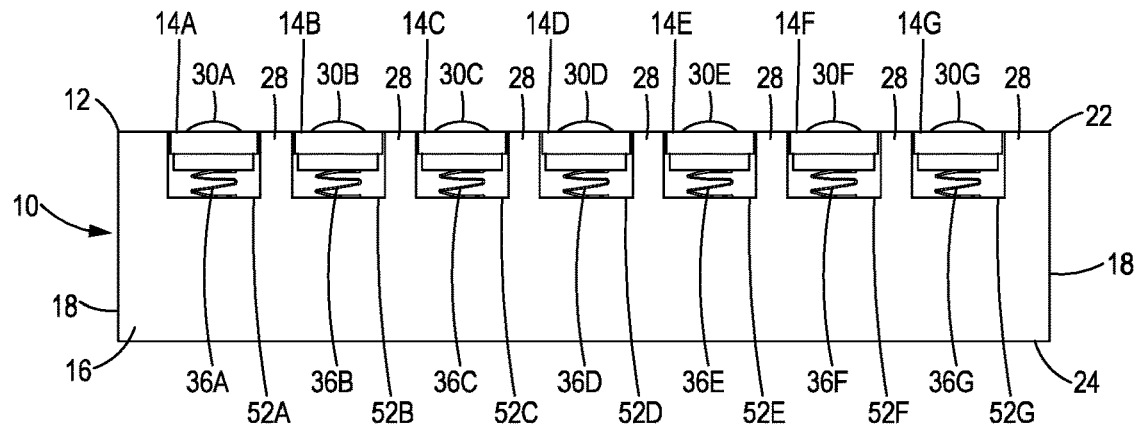
FIG. 3 is a front view of the variable force keyboard of FIG. 1.
Figure 4:
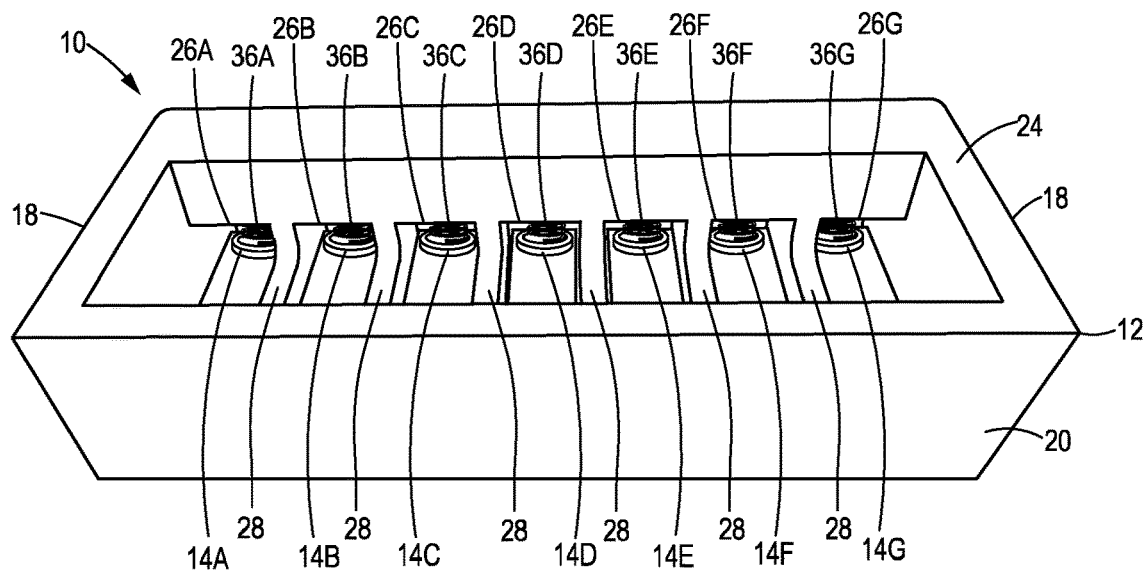
FIG. 4 is a bottom rear isometric view of the variable force keyboard of FIG. 1.

Referring to FIG. 3 (front view) and FIG. 4 (bottom rear view), the keys 14A-14G may be biased upward by corresponding key springs 36A-36G that are positioned proximate the front wall 16 of the keyboard box 12. The keyboard box 12 and the keys 14A-14G are configured to receive the key springs 36A-36G and retain them in position after assembly. As shown in FIG. 5, box spring recesses 38A-38G are defined in the keyboard box 12 proximate the intersection of the front wall 16 and the bottom wall 24 in between the dividing walls 28 so that the box spring recesses 38A-38G are beneath the corresponding key openings 26A-26G. FIGS. 6 and 7 illustrate the key 14G in greater detail, with the key 14G be representative of the configurations of the keys 14A-14G. The key 14G has a front end 40G and a rear end 42G, with the finger rests 30G and the raised key indicia 32 being positioned proximate the front end 40G on a top surface 44G. As shown in FIG. 7, the key 14G has a key spring recess 46G proximate the front end 40G and positioned to align with the box spring recess 38G of the keyboard box 12. An annular spring retention ring 48G may extend downward from a bottom surface 50G of the key 14G to ensure that the corresponding end of the key spring 36G remains captured within the key spring recess 46G as the key 14G is manipulated by a user of the variable force keyboard 10.

In this embodiment, the keys 14A-14G may be pivotally connected to the keyboard box 12 so that the keys 14A-14G rotate between the normal biased position shown in the drawing figures and a fully depressed position where the bottom surfaces 50A-50G are in contact with shoulders 52A-52G (FIGS. 3 and 5), respectively, defined in the front wall 16 for the key openings 26A-26G. Referring back to FIGS. 6 and 7, the key 14G has a key pivot shaft opening 54G extending therethrough proximate the rear end 42G. The keyboard box 12 may have corresponding box pivot shaft openings 56 (FIG. 8) through the sidewalls 18 and dividing wall pivot shaft openings (not shown) that are aligned with the key pivot shaft openings 54A-54G when the keys 14A-14G are inserted into the key openings 26A-26G. With the pivot shaft openings 54A-54G, 56 aligned, a pivot shaft (not shown) to be inserted therethrough to pivotally secure the keys 14A-14G to the keyboard box 12.

Figure 8:
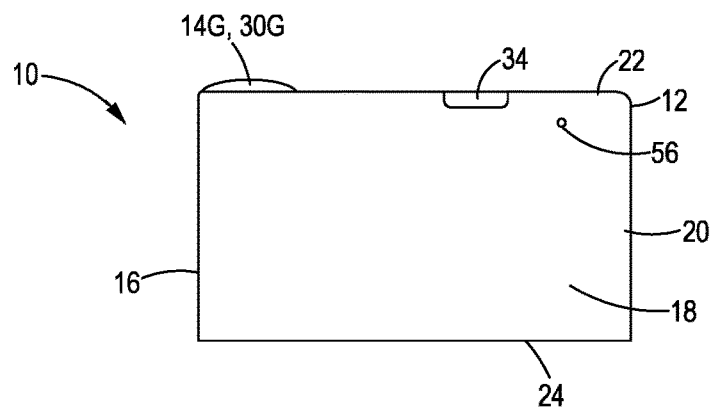
FIG. 8 is a side view of the variable force keyboard of FIG. 1.

After the keys 14A-14G are attached to the keyboard box 12, the key springs 36A-36G may be installed between the corresponding box spring recesses 38A-38G and key spring recesses 46A-46G. The key springs 36A-36G have lengths that force the keys 14A-14G upward away from the shoulders 52A-52G at least to the normal positions shown in FIGS. 1, 3 and 8, and in some implementations slightly above the top wall 22 to an amount sufficient to accommodate standard spring manufacturing length tolerances. To set the keys 14A-14G at the normal positions such that the key top surfaces 44A-44G are approximately in the same plane as the box top wall 22, and to prevent over rotation of the keys 14A-14G away from the shoulders 52A-52G, the lock bar 34 is installed proximate the rear wall 20 and an axis of rotation of the keys 14A-14G defined by the pivot shaft. The top wall 22 may include box lock bar grooves 58 (FIG. 5) and the keys 14A-14G may include key lock bar grooves 60A-60G (FIGS. 6 and 7, groove 60G) that are aligned and receive the lock bar 34 therein as shown in FIGS. 1, 2 and 8. The lock bar 34 may be secured to the keyboard box 12 by appropriate fastening mechanisms that either permanently or temporarily attached the lock bar 34 to the keyboard box 12. Installation of the lock bar 34 and corresponding downward movement of the keys 14A-14G may slightly compress and preload the key springs 36A-36G in preparation for use as described hereinafter.

As discussed above, the keys 14A-14G and the key springs 36A-36G of the variable force keyboard 10 are configured to apply varying resistance forces to represent a graphable or mathematical concept when the keys 14A-14G are depressed by a user, and in particular by a blind or visually impaired student. Each of the key springs 36A-36G may have a length, a material and/or a spring constant to create a resistive force to depression of the corresponding key 14A-14G so that the order of the keys 14A-14G and their resistive forces provides a tactile representation of the modeled concept. In the illustrated embodiment, where the lock bar 34 is temporarily attached to the keyboard box 12, the lock bar 34 may be removed so that the key springs 36A-36G may be replaced with key springs 36A-36G having different resistive forces to change the graphical or mathematical concepted modeled by the variable force keyboard 10.

Attention may be necessary in the various implementations of the variable force keyboard 10 to assure that the keys 14A-14G move relative to the keyboard box 12 with minimal frictional resistance. It may be important as a learning tool to have the widest range of resistive forces available to best represent a relationship being represented by a configuration of the variable force keyboard 10. Some user testing suggested that individual limits in depressing the keys 14A-14G may be within a range of approximately 25-30 pounds of applied force on the high end. To assure meaningful use spring forces at the lower end, frictional drag on the motion of the keys 14A-14G should be eliminated to the extent possible. Such efforts may include using a relatively small diameter pivot shaft compared to the lengths of the keys 14A-14G and having loose slip fits between the pivot shaft and the key pivot shaft openings 54A-54G. It may also be important to prevent contact between the keys 14A-14G and the surfaces defining the key openings 26A-26G. The rear ends 42A-42G may be disposed forward of and out of contact with the rear wall 20. The key pivot shaft openings 54A-54G may have a slip fit with the pivot shaft that is loose but not loose enough to let the keys 14A-14G wobble sideways to contact the dividing walls 28. Detached washers or integrally formed raised ribs (not shown) may be included around the key pivot shaft openings 54A-54G to maintain spacing of the keys 14A-14G from the dividing walls 28 and minimized contacting, and correspondingly frictional forces, therebetween. In addition, the key lock bar grooves 60A-60G may be configured to avoid rubbing against the lock bar 34 when the keys 14A-14G are pressed. Limiting contact to the areas proximate the pivot shaft may greatly reduce the frictional resistance to movement of the keys 14A-14G experienced by a user when pressing the keys 14A-14G. Limited friction may allow use of key springs 36A-36G at the low end that may barely support the weight of the keys 14A-14G that may be approximately 0.02 pounds in some implementations.

Figure 9:
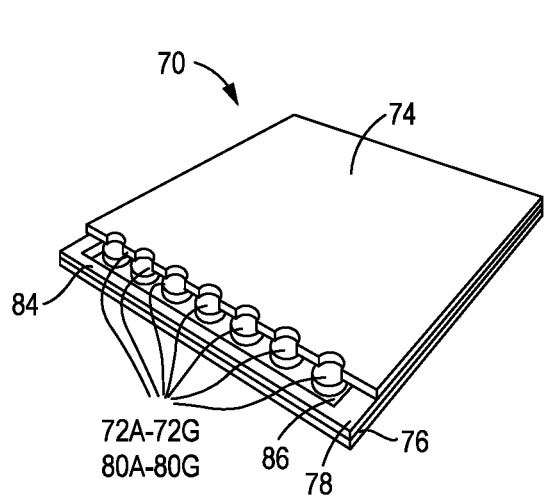
FIG. 9 is an isometric view of an alternative embodiment of a variable force keyboard in accordance with the present disclosure.
Figure 10:
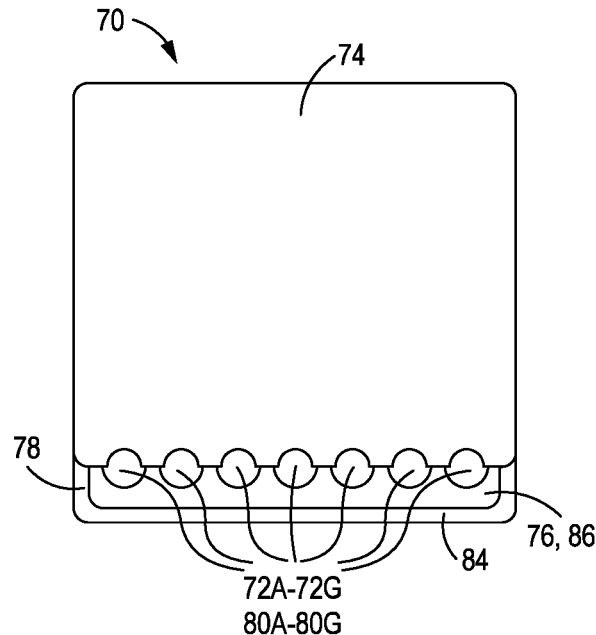
FIG. 10 is a top view of the variable force keyboard of FIG. 9.

FIGS. 9-12 illustrate an alternative embodiment of a variable force keyboard 70 wherein keys 72A-72G are provided in the form of cantilever springs configured to have varying resistance forces to represent graphical, mathematical and/or physical relationships. Referring to FIG. 9, the variable force keyboard 70 as illustrated includes a top plate 74, a bottom plate 76 and a cantilever plate 78 disposed therebetween to form a keyboard box. The plates 74, 76, 78 have rectangular shapes, with the top plate 74 having less depth than the bottom plate 76 and the cantilever plate 78 so that key ends 80A-80G of the keys 72A-72G are exposed and engageable by a user of the variable force keyboard 70 (see FIG. 10). In alternative embodiments, the depth of top plate 74 may be equal to the depths of the other plates 76, 78, and the top plate 74 may have a key access cutout section over the key ends 80A-80G to provide access to the keys 72A-72G.

Figure 11:
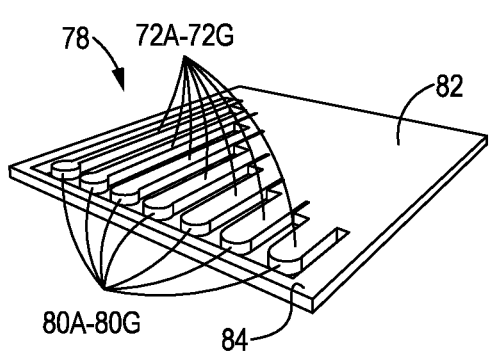
FIG. 11 is an isometric view of a cantilever plate of the variable force keyboard of FIG. 9.

The cantilever plate 78 may be fabricated from any appropriate flexible material, such as polymethyl methacrylate (PMMA or plexiglass), polyethylene (PE), polycarbonate (PC), flexible metals and the like, that may bend when a force is applied and return to its original shape when the force is removed. As shown in FIG. 11, the keys 72A-72G may be formed by removing or omitting material from the cantilever plate 78 so the keys 72A-72G extend as cantilevers from a rear or base portion 82 of the cantilever plate 78 to a front edge 84 of the cantilever plate 78 so that the key ends 80A-80G are positioned in the open area formed by the top plate 72. The length, width and/or thickness of each key 72A-72G is varied as necessary so that the relative resistances of the keys 72A-72G to being depressed will provide a tactile representation of the graphable, mathematical and/or physical relationship being modeled by the variable force keyboard 70. For example, keys 72A-72G with a short length will be stiffer than longer keys 72A-72G, and wider or thicker keys 72A-72G will be stiffer than narrow, thin keys 72A-72G. Although being illustrated herein as having uniform widths and thicknesses along their entire lengths, those skilled in the art will understand that the keys 72A-72G may have tapered widths and thicknesses as necessary to reduce internal material stress concentrations along the cantilever lengths so as to maintain the cantilever flexible properties over the full range of motion of the keys 72A-72G when they are depressed. Further, the key ends 80A-80G may have a uniform geometry and spacing to avoid suggesting resistance differences between the keys 72A-72G. At the same time, the key ends 80A-80G may include finger rests and raised indicia as discussed above.

Figure 12:
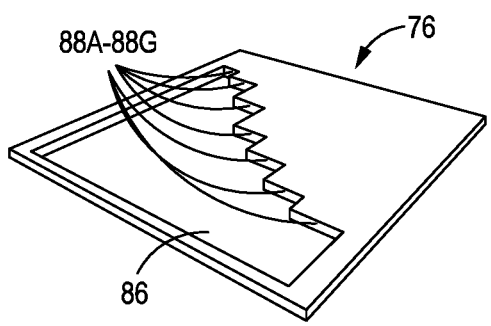
FIG. 12 is an isometric view of a bottom plate of the variable force keyboard of FIG. 9.

As shown in FIG. 12, the bottom plate 76 is configured with a key depression cutout 86 defined therein under the keys 72A-72G when the keyboard box is assembled to allow for the downward movement when the keys 72A-72G are depressed. The key depression cutout 86 may define a plurality of key shoulders 88A-88G that are disposed proximate intersections of corresponding keys 72A-72G with the base portion 82 of the cantilever plate 78 to allow deflection of the keys 72A-72G when depressed by a user. The illustrated configuration of the keys 72A-72G is exemplary, and the lengths, widths and thicknesses will vary between the keys 72A-72G as necessary to represent the relationship being modeled in a particular implementation of the variable force keyboard 70.

INDUSTRIAL APPLICABILITY

The variable force keyboards 10, 70 in accordance with the present disclosure may be configured to represent a wide variety of graphical and mathematical concepts. While both variable force keyboards 10, 70 and other embodiments of variable force keyboards in accordance with the present disclosure may be configured to represent the concepts discussed herein and other concepts, the variable force keyboard 10 used in the following examples is provided for simplicity of discussion, and is in no way limiting on the alternative embodiments of the variable force keyboard. In one exemplary implementation of the variable force keyboard 10, the arrangement of resistance forces of the keys 14A-14G may mimic the relationship of the Apparent Stellar Magnitude (m) concept in astronomy. Apparent Stellar Magnitude is the measure of the brightness of a star or stellar object as observed from Earth. This brightness depends on its natural luminosity, its distance from the earth, and any interference by dust or other objects along the line of sight from the Earth to the object. The Apparent Stellar Magnitude is a direct measurement of the observed light energy from the stellar object. The Apparent Stellar Magnitude is not a measurement that is in any manner related to the objects size, since a small star close Earth will often appear brighter than a large star far away from Earth. In fact, the reverse is more likely as the brightness and other characteristics of the incoming light are the fundamental measurements from which the object's size, distance and its relationship to Earth are calculated. An object's size, distance from Earth and other attributes are calculated parameters that are derived from the incoming light spectrum. Thus, having a good understanding of brightness is important since it is a fundamental measurement in the field of astronomy.

Figures 13, 13A:
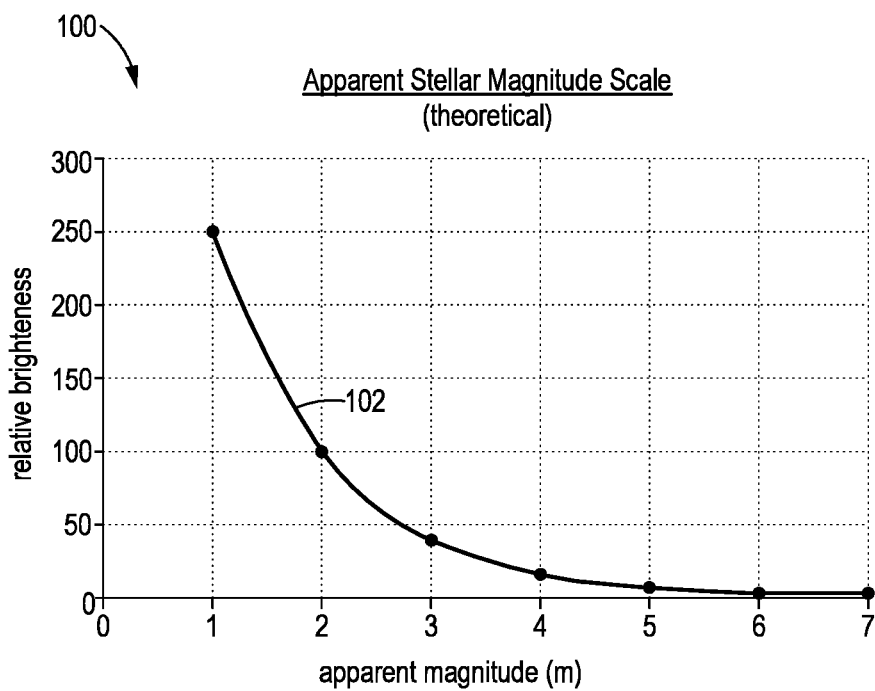
FIG. 13 is a graph of the Apparent Stellar Magnitude scale.
FIG. 13A is a chart of relative brightness values for the graph of FIG. 13.

FIG. 13 is a graph 100 of Apparent Stellar Magnitude versus relative brightness. The Apparent Stellar Magnitude scale represented by a curve 102 is a reverse logarithmic scale, i.e., the brighter the object is in the sky, the lower its magnitude. A chart 104 in FIG. 13A provides exemplary relative brightness values for 1.0 m-7.0 m. A brightness ratio of 100 has been set as a difference of 5.0 m in Apparent Stellar Magnitude. This leads to a brightness ratio of about 2.512 for a 1.0 m difference in apparent magnitude. (. For example, a star of magnitude 2.0 m is 2.512 times brighter than a star of magnitude 3.0 m, 6.31 times brighter than a star of magnitude 4.0 m, and 100 times brighter than one of magnitude 7.0 m. The brightest objects in the sky have a negative magnitude rating such as the Sun at −26.7 m, Venus at −4.2 m and Sirius at −1.46 m. The faintest stars visible to the human eye on a dark night have an apparent magnitude of about +6.5 m. Anything dimmer gets lost in the background light noise and must be observed via a telescope. Thus, the naked eye typically is able to detect a range of about 7 units on the apparent magnitude scale.

Figures 14, 14A:
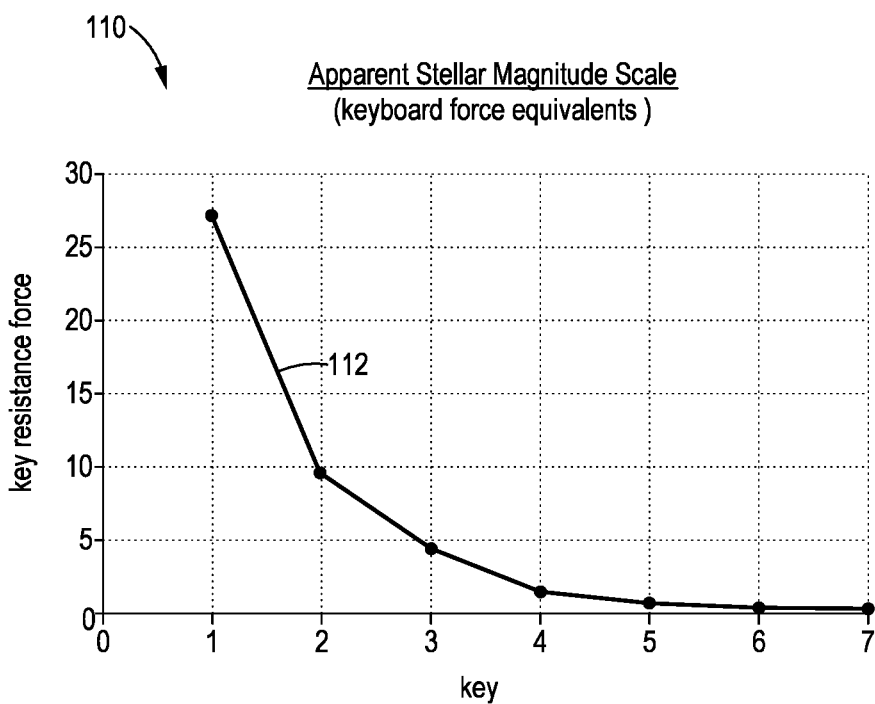
FIG. 14 is a graph of the Apparent Stellar Magnitude scale converted to resistance force values for keys of the variable force keyboard of FIG. 1.
FIG. 14A is a chart of spring force values for the graph of FIG. 14.

The variable force keyboard 10 as conceived in this implementation may be called a Stellar Magnitude Keyboard. FIG. 14 is a graph 110 of the Apparent Stellar Magnitude scale with a curve 112 representing apparent magnitudes converted into spring force values for the keys 14A-14G. The shape of the curve 112 is geometrically similar to the shape of the Apparent Stellar Magnitude curve 102. Each key 14A-14G may represent one unit on the apparent magnitude scale as shown in the chart 114 of FIG. 14A. The keys 14A-14G and resistance forces of the key springs 36A-36G may be arranged such that the ratio of the depression forces between any two adjacent keys 14A-14G is approximately 2.5. With the range illustrated by the curve 112 and the chart 114, the forces range from a very high force on the left end of the variable force keyboard 10 that may be difficult for some to depress to a very light force that can barely be detected by normal touch at the right end of the variable force keyboard 10. The forces are created by configuring the key springs 36A-36B to give the correct force when depressed approximately ¼ inch. Thus, the physical response of the keys 14A-14G experienced by the person operating the variable force keyboard 10 provides a tactile representation of the graphical and mathematical relationship of Apparent Stellar Magnitude illustrated in the graphs 100, 110.

In one educational implementation, the Stellar Magnitude Keyboard may be used in combination with a comparison variable force keyboard that can be created by simply replacing the key springs 36B-36F in the Apparent Stellar Magnitude example to model a linear relationship as the keys 14A-14G are pressed in sequence. The high force initial key spring 36A and the low force key spring 36G may be identical to the Stellar Magnitude Keyboard, but the intermediate key spring forces are arranged so that the mathematical difference between any two adjacent key spring forces decreases by a fixed amount as the user progresses from the first key 14A toward the last key 14G. This creates a useful educational comparison where the Stellar Magnitude Keyboard presents a fixed ratio between the key forces and the comparison keyboard presents a fixed difference between the key forces moving between the same end values.

Figure 15:
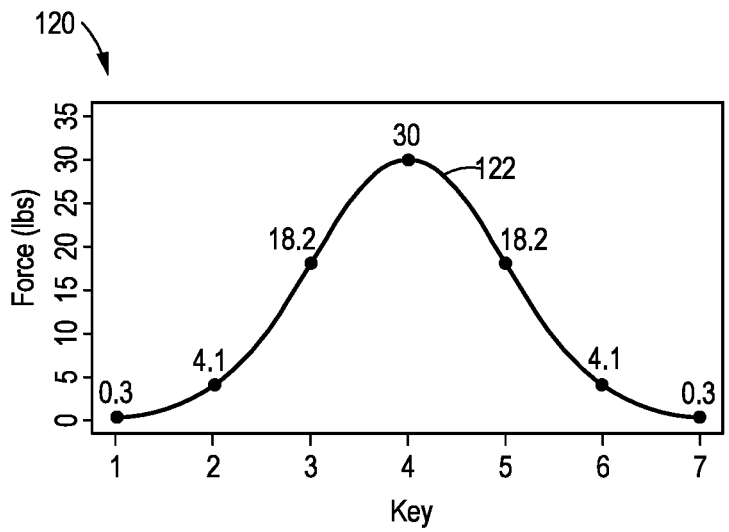
FIG. 15 is a graph of a normal distribution curve.
Figure 15A:
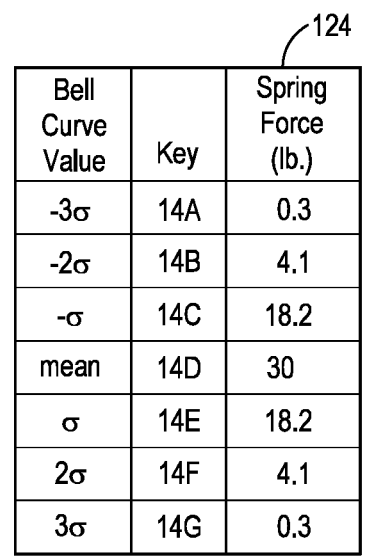
FIG. 15A is a chart of spring force values for the graph of FIG. 15.

In alternative embodiments, the variable force keyboard 10 can be re-configured in almost unlimited ways to represent other real-world graphical, mathematical and physical relationships. Simply selecting different properties for the key springs 36A-36G to provide different resulting resistive forces to depressing the keys 14A-14G and arrangement of the forces to yield the desired progression of key forces when moving between the keys 14A-14G to represent or simulate a particular relationship. As another example, in the field of statistics, a bell-shaped curved graphically illustrates the well-established normal distribution of probable values of a variable that is symmetrical on both sides of the mean. In a normal distribution of data, the measurements are observed to fall between seven statistically defined positions—the center mean value, 1, 2 and 3 standard deviations (sigma) to the left of the mean, and 1, 2 and 3 standard deviations positions to the right of the mean. A graph 120 of an exemplary normal distribution or bell curve 122 is depicted in FIG. 15. In this embodiment, each key 14A-14G would represent one of the relevant points on the normal distribution curve 122. A set of data points encompassing the entire distribution would then be represented as a distribution of force points with the mean value represented by the spring force provided by the key spring 36D of the middle key 14D as shown in the chart 124 of FIG. 15A. The spring forces will decrease for the keys 14A-14C, 14E-14F as they move outward from the middle key 14D. Individuals using the variable force keyboard 10 as a simulation of the distribution of normal distribution data might get a better tactile feeling of the distribution. For example, if a resistance force felt by a user when depressing the center key 14G represents mean data values and the full distribution (99.7%) is represented by the combined resistance forces of all the keys 14A-14G, then 68% of the measured data would fall between represented by the combined resistance forces represented by the keys 14C-14E and 95% of the measured data would fall between the combined resistance forces of the keys 14B-14F. Many other useful comparisons can be made to aid the user in understanding the likeliness of finding data between the resistance forces represented by an two keys 14A-14G. The configuration of the variable force keyboard 10 may modified to represent a skewed bell curve that is shifted to the left or right relative to the normal distribution curve by adjusting the maximum spring force for the keys 14A-14G to the left or right as necessary to represent the statistical distribution.

Figure 16:
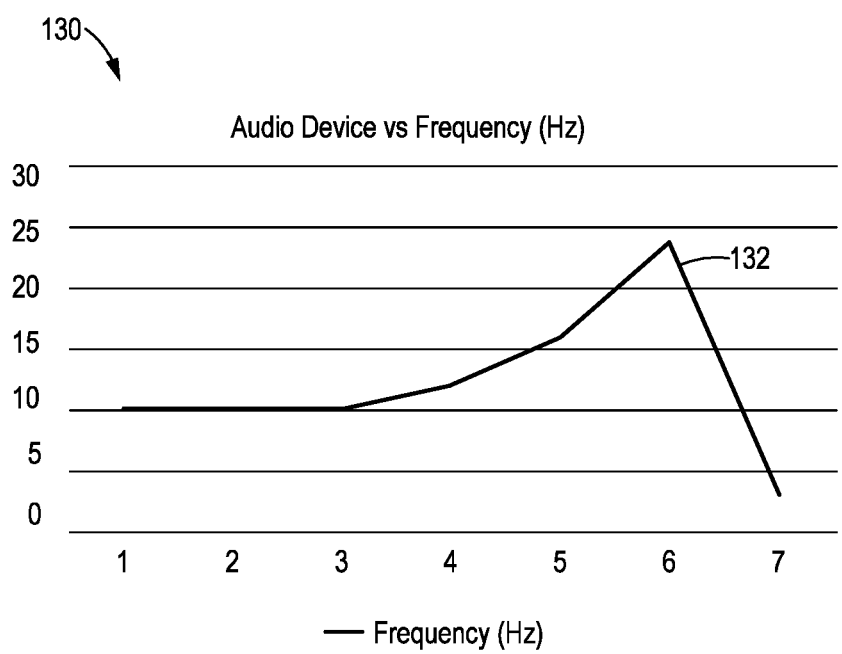
FIG. 16 is a graph of frequency versus audio output for an exemplary audio device.

A further exemplary implementation of the variable force keyboard 10 may model a frequency response curve in a typical audio device such as a microphone or speaker. A graph 130 of FIG. 16 illustrates a frequency versus audio output curve 132 for an exemplary audio device. The curve 132 demonstrates a steady output over much of the frequency range, then exhibits a pronounced peak in output at the natural resonance frequency of the device followed by a pronounced decrease in output above the resonance frequency. Similar relationships can exist in many mass/spring arrangements used to model mechanical dynamic systems. When used in typical audio transducers such as microphones or speakers, the frequency versus output performance graph 130 is a key measure of the products performance. When modeling these types of applications, the keys 14A-14G may represent locations along the audio frequency spectrum and the resistance forces of the key springs 36A-36G may represent the voltage characteristics of the modeled audio device.

An actual music keyboard has a different type of logarithmic scale. In a musical keyboard, twelve keys constitute an octave and the relationship between any two neighboring keys is based on a logarithmic relationship that is different than the logarithmic relationship of Apparent Stellar Magnitude. A musical keyboard has twelve keys between each octave, and the frequency doubles from one octave to the next octave. For example, the frequency of middle C is usually pitched near 260 Hz, and the frequency of the next octave C is 520 Hz. Mathematically, therefore, the ratio of the frequencies between any two keys is the twelfth root of two, which equates to a frequency ratio of approximately 1.059463. Using this scale with a variable force keyboard 10 configured with 12 keys14, the resistance force would change with the same graphical logarithmic curve, but only double between the first key 14 and the last key 14. Experience with this ratio has indicated it would be difficult for humans to distinguish between each key 14 as they depress each key 14, but this would be similar to the actual audio experience where differentiating between each note is dependent on the human ear's ability to distinguish the difference between adjacent frequencies. Consequently, such a configuration of the variable force keyboard 10 could be of particular value in explaining the musical scale to deaf and hearing-impaired individuals.

Those skilled in the art will understand that the variable force keyboard 10 illustrated and described herein is exemplary, and alternative embodiments of variable force keyboards where variations in the resistance forces to depressing keys represent graphical, mathematical or physical relationships are contemplated by the inventors. As discussed above, in one variation, the key springs 36A-36G are easily replaceable to reconfigure the variable force keyboard 10 for various spring force relationships depending on the desired relationship being represented. As discussed for the illustrated embodiment, the lock bar 34 may be a removeable constraint for holding the keys 14A-14G to hold the key springs 36A-36G in place when attached, but allowing the keys 14A-14G to swing open to allow access for replacement of the key springs 36A-36G when the lock bar 34 is not attached. The lock bar 34 may also serve as a label area where the key information can be readily relabeled for each key force configuration.

Figure 17:
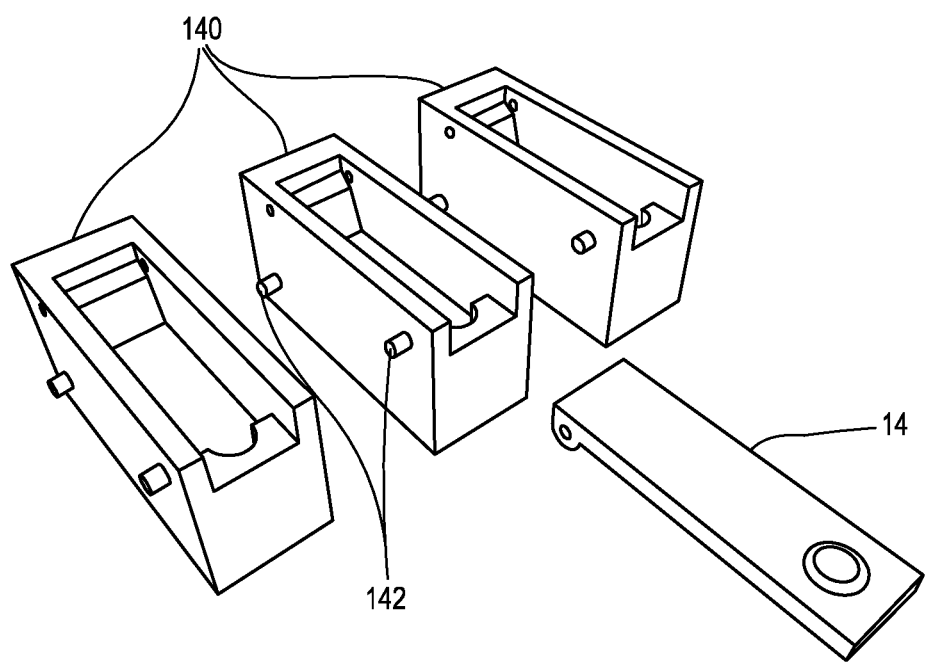
FIG. 17 is an isometric view of a plurality of modular key boxes that are connectable to form the variable force keyboard of FIG. 1.

In other embodiments, the variable force keyboard 10 may have a modular design wherein a quantity of individual spring-loaded devices is provided that are designed to snap together to form a multi-key keyboard. For example, FIG. 17 illustrates a design where modular key boxes 140 are configured to be assembled to form the variable force keyboard 10. Each key box 140 may be configured similar to an individual position for one of the keys 14A-14G of the variable force keyboard 10 and have connection mechanisms on either side so that a plurality of the key boxes 140 can be assembled side-to-side to form the variable force keyboard 10. For example, as shown, one side of each of the key boxes 140 has one or more connection arms 142 extending outward, and the opposite side has corresponding connection apertures (not shown) that receive the connection arms 142 of an adjacent key box 140. The key boxes 140 may be assembled in different configurations with different arrays of spring forces to model different relationships. The number of keys utilized in a configuration and the granularity of differences in the key forces between adjacent key boxes 140 may be dictated by the tactile sensitivity of the users of the variable force keyboard 10. However, a relatively limited number of key boxes 140 would need to be supplied in a kit to provide the capability to model a wide range of graphical, mathematical and physical relationships.

Further variations to the structure of the variable force keyboard 10 are contemplated. For example, while the keys 14A-14G are configured for rotational movement relative to the keyboard box 12, the keys 14A-14G may have alternative paths of movement. In some embodiments, the keys 14A-14G may be configured to move linearly. Further alternative simple or complex paths of motion are contemplated. Additionally, alternative mechanisms may be provided to create the resistive force when the keys 14A-14G are depressed. While the key springs 36A-36G are illustrated as being coil springs, other types of springs or resilient device may be provided to resist movement of the keys 14A-14G. Such springs or resilient devices may be variable so that the resistive force can be changed by adjusting the device without the necessity of replacing the devices. In other embodiments, electro-mechanical devices such as solenoids may be implemented such that a resistive force is created when a current is provided to the device. Such an arrangement may facilitate reconfiguring the variable force keyboard 10 by adjusting the current to the electro-mechanical devices to vary the resistive forces of the keys 14A-14G to model different relationships without physically reconfiguring the variable force keyboard 10.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A variable force keyboard comprising:
    a keyboard box;
    a plurality of keys operatively connected to the keyboard box for movement relative to the keyboard box; and
    for each of the plurality of keys, a key spring operatively connected between the keyboard box and a corresponding one of the plurality of keys to provide a resistive force that opposes movement of the corresponding one of the plurality of keys, wherein the variable force keyboard is configured to model a graphical, mathematical or physics relationship by varying the resistive force of the key spring of each of the plurality of keys to correspond to values of the graphical, mathematical or physics relationship modeled by the variable force keyboard, wherein resistive forces are varied between adjacent keys to create a progression of the resistive forces when moving between a sequence of the plurality of keys to model the graphical, mathematical or physics relationship.

2. The variable force keyboard of claim 1, wherein the key spring of each of the plurality of keys comprises coil spring.

3. The variable force keyboard of claim 1, wherein the plurality of keys is pivotally coupled to the keyboard box.

4. The variable force keyboard of claim 1, wherein the plurality of keys move linearly relative to the keyboard box.

5. The variable force keyboard of claim 1, wherein the key spring of each of the plurality of keys comprises solenoid actuator, and wherein the resistive force of the solenoid actuator is variable based on an amount of current supplied to the solenoid actuator.

6. The variable force keyboard of claim 1, wherein the variable force keyboard is configured to model a logarithmic scale such that a ratio of the resistive forces between the adjacent keys of the plurality of keys has a constant value.

7. The variable force keyboard of claim 1, wherein the keyboard box comprises a plurality of key boxes each having a corresponding one of the plurality of keys operatively connected thereto, wherein the plurality of key boxes include key box connection mechanisms connecting the plurality of key boxes side-by-side to form the variable force keyboard.

8. The variable force keyboard of claim 1, wherein the variable force keyboard is configured to model a normal distribution of data values such that a middle key of the plurality of keys has a maximum resistive force representing a mean value of the normal distribution of data values, and the resistive force of the plurality of keys decreases as a distance to a location of each of the plurality of keys from the middle key increases.

9. The variable force keyboard of claim 1, wherein the keyboard box and the plurality of keys are configured so that the key spring of each of the plurality of keys is replaceable to change the resistive force applied to the corresponding one of the plurality of keys.

10. A method for providing a tactile representation of a graphical, mathematical or physics relationship on a variable force keyboard, the method comprising:
    providing a keyboard box;
    mounting a plurality of keys to the keyboard box, wherein each of the plurality of keys is movable relative to the keyboard box; and
    providing a resistive force on each of the plurality of keys against movement relative to the keyboard box, whereby the resistive force on each of the plurality of keys is varied to correspond to values of the graphical, mathematical or physics relationship to provide the tactile representation of the graphical, mathematical or physics relationship on the variable force keyboard, wherein resistive forces are varied between adjacent keys to create a progression of the resistive forces when moving between a sequence of the plurality of keys to model the graphical, mathematical or physics relationship.

11. The method for providing the tactile representation of claim 10, wherein mounting the plurality of keys comprises pivotally mounting the plurality of keys to the keyboard box.

12. The method for providing the tactile representation of claim 10, wherein providing the resistive force comprises providing a key spring for each of the plurality of keys that applies the resistive force to a corresponding one of the plurality of keys.

13. The method for providing the tactile representation of claim 10, wherein each of the plurality of keys comprises a cantilever spring mounted to the keyboard box, wherein providing the resistive force on each of the plurality of keys comprises varying dimensions of the cantilever spring to vary the resistive force of the cantilever spring against movement of the cantilever spring relative to the keyboard box.

14. The method for providing the tactile representation of claim 10, wherein the tactile representation provided by the variable force keyboard is an Apparent Stellar Magnitude scale.

15. A variable force keyboard comprising:
    a keyboard box; and
    a plurality of keys operatively connected to the keyboard box for movement relative to the keyboard box, wherein each of the plurality of keys has a resistive force applied thereto that opposes movement of a corresponding one of the plurality of keys relative to the keyboard box, wherein the variable force keyboard is configured to model a graphical, mathematical or physics relationship by varying the resistive force applied to each of the plurality of keys to correspond to values of the graphical, mathematical or physics relationship modeled so that depressing the plurality of keys provides a tactile representation of the graphical, mathematical or physics relationship, wherein resistive forces are varied between adjacent keys to create a progression of the resistive forces when moving between a sequence of the plurality of keys to model the graphical, mathematical or physics relationship.

16. The variable force keyboard of claim 15, comprising, for each of the plurality of keys, a key spring operatively connected between the keyboard box and the corresponding one of the plurality of keys to provide the resistive force that opposes the movement of the corresponding one of the plurality of keys relative to the keyboard box.

17. The variable force keyboard of claim 16, wherein the key spring for each of the plurality of keys is replaceable to change the resistive force applied to the corresponding one of the plurality of keys to thereby change the graphical, mathematical or physics relationship modeled by the variable force keyboard.

18. The variable force keyboard of claim 15, wherein the plurality of keys is pivotally coupled to the keyboard box.

19. The variable force keyboard of claim 15, wherein the plurality of keys comprises a plurality of cantilever springs mounted to the keyboard box, wherein applying the resistive force on each of the plurality of keys comprises varying dimensions of each of the cantilever springs to vary the resistive force of each of the cantilever springs against the movement relative to the keyboard box.

20. The variable force keyboard of claim 19, wherein the keyboard box comprises:
   a top plate;
   a bottom plate; and
   a cantilever plate disposed between the top plate and the bottom plate and having the plurality of cantilever springs formed in the cantilever plate, wherein the top plate has a top plate depth that is less than a keyboard box depth so that a key tip of each of the plurality of cantilever springs is exposed and engageable, and wherein the bottom plate includes a key depression cutout disposed beneath the plurality of cantilever springs to allow each of the plurality of cantilever springs to deflect toward the bottom plate when a downward force is applied to the key tip of the corresponding one of the plurality of cantilever springs.

* * * * *